(12) United States Patent
Linemann et al.

(10) Patent No.: US 7,105,615 B2
(45) Date of Patent: Sep. 12, 2006

(54) SYNTHESIS METHOD FOR POLYDIMETHYLKETENE BY FRIEDEL-CRAFT CATIONIC POLYMERIZATION OF DIMETHYLKETENE

(75) Inventors: Reinhard Linemann, Nassandres (FR); Guillaume Le, Caen (FR)

(73) Assignee: Arkema France, Puteaux (FR)

( * ) Notice: Subject to any disclaimer, the term of this patent is extended or adjusted under 35 U.S.C. 154(b) by 0 days.

(21) Appl. No.: 10/534,120

(22) PCT Filed: Nov. 3, 2003

(86) PCT No.: PCT/FR03/03266

§ 371 (c)(1),
(2), (4) Date: May 5, 2005

(87) PCT Pub. No.: WO2004/044030

PCT Pub. Date: May 27, 2004

(65) Prior Publication Data

US 2006/0014910 A1 Jan. 19, 2006

(30) Foreign Application Priority Data

Nov. 5, 2002 (FR) .................................. 02 13828

(51) Int. Cl.
*C08F 2/00* (2006.01)
(52) U.S. Cl. ................. 526/89; 526/157; 526/158; 526/348.7; 526/348; 502/103; 502/132

(58) Field of Classification Search ................. 526/89, 526/157, 158, 348.7, 348; 502/103, 132
See application file for complete search history.

(56) References Cited

U.S. PATENT DOCUMENTS

| 4,356,295 | A | 10/1982 | Fujii et al. |
| 6,512,916 | B1 | 1/2003 | Forbes, Jr. |
| 6,846,885 | B1 * | 1/2005 | Langstein et al. ............. 526/89 |
| 2002/0086959 | A1 * | 7/2002 | Langstein et al. ........... 526/157 |

FOREIGN PATENT DOCUMENTS

WO WO 01/00686 A1 1/2004

* cited by examiner

*Primary Examiner*—Ling-Sui Choi
(74) *Attorney, Agent, or Firm*—Thomas F. Roland

(57) ABSTRACT

The invention concerns a cationic catalyst system comprising an initiator (I), a catalyst (K) and a cocatalyst (CoK). The cocatalyst (CoK) is an agent releasing the active polymerizing center of its counter anion generated by the reaction between the catalyst (K) and the initiator (I). Said cocatalyst is characterized by the existence of a double bond electron-depleted by an electroattractive group. It is selected, for example, from the group consisting of the following complexing agents including o-chloranyl (3,4,5,6-tetrachloro-1, 2-benzoquinone), p-chloranyl (2,3,5,6-tetrachloro-1,4-benzoquinone), nitrobenzene, trinitrobenzene, or tetracyanoethylene.

10 Claims, 1 Drawing Sheet

SYNTHESIS METHOD FOR POLYDIMETHYLKETENE BY FRIEDEL-CRAFT CATIONIC POLYMERIZATION OF DIMETHYLKETENE

This application claims benefit, under U.S.C. §119 or §365 of French Application Number 02/13828, filed Nov. 5, 2002; and PCT/FR2003/003266 filed Nov. 3, 2003.

FIELD OF THE INVENTION

A subject matter of the invention is a process for the synthesis of a polymer, polydimethylketene (abbreviated to PDMK in the continuation of the text), from dimethylketene (abbreviated to DMK in the continuation of the text) as comonomer. The synthesis of this polymer is carried out by a cationic catalytic polymerization process involving an initiator, a catalyst and a cocatalyst. Another subject matter of the invention is a polymer obtained by said process.

BACKGROUND OF THE INVENTION

The presence of two adjacent carbon-carbon and carbon-oxygen double bonds confers a very high reactivity on dimethylketene. It is advantageous to selectively direct the opening of one or other of the double bonds in order to promote uniform polymerization of the monomer units (A), resulting in polymers with β-ketone structures (PolyA), or uniform polymerization of the monomer units (B), resulting in polymers with structures of vinyl polyacetal type (PolyB), indeed even in the alternating addition of the (A) and (B) units, resulting in a vinyl polyester (PolyAB).

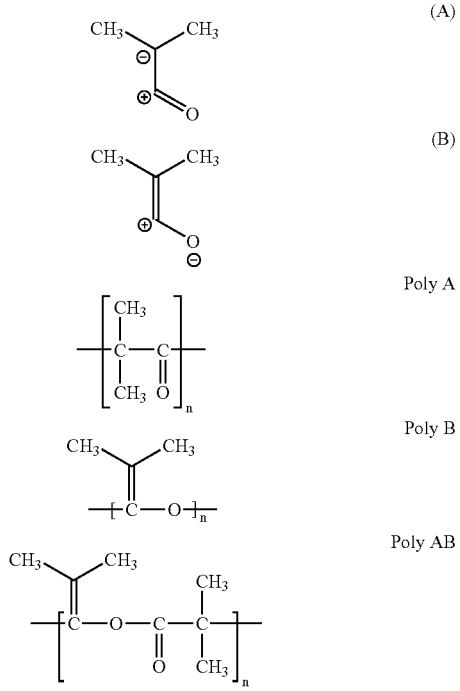

The first polymerization of DMK was described by H. Staudinger in 1925. He carried out the polymerization at a temperature of −80° C. to 0° C. in the presence of trimethylamine as catalyst. The product obtained was described as an amorphous and noncrystallizable cyclic trimeric compound comprising 3 units of monomer (A) and 2 units of monomer (B).

Patent GB-893 308 discloses the synthesis of a crystalline polymer resulting from the polymerization of (A) and (B) units at a temperature of between −80° C. and −20° C. with aluminum-based catalysts ($AlCl_2(C_2H_5)$, $AlCl(C_2H_5)_2$, $Al(C_6H_5)Cl_2$, $Al(OC_3H_7)Br_2$, $AlBr_3$, $AlCl_8.O(C_2H_5)_2$ or $AlEt_3$), a beryllium-based catalyst ($Be(C_2H_5)_2$) or a zinc-based catalyst ($Zn(C_4H_9)_2$).

Patent GB-987 370 relates to an improvement to the preceding patent. It provides a process for the synthesis of PDMK comprising more than 93% by weight of β-ketone unit by carrying out the synthesis in a solvent having a high dielectric constant and in the presence of $AlBr_3$ or of $AlCl_2Et$. The solvents used are nitrobenzene, toluene, dichloromethane, 1,1,1,2-tetrachloroethane and 1,1-dichloroethylene.

The state of the art in the field of the cationic polymerization of dimethylketene (DMK) does not report the use, on the one hand, of an initiator (I) or of a cocatalyst (CoK). The catalyst generally employed is a Lewis acid suspended alone in a solvent or a solvent mixture. In a few cases, the Lewis acid is dissolved in a polar solvent or a mixture of solvents, at least one of which is polar.

However, while these processes using only a Lewis acid as catalyst make it possible to obtain a β-ketone polymer with a high selectivity, the synthetic yields are too low to envisage an industrial operation (yield <65%). This is because, in such systems, two forms of initiation are superimposed:

Initiation due to the reaction between the traces of water and the Lewis acid, releasing an acidic proton, the true initiator of the cationic polymerization of DMK.

Initiation due to the self-dissociation of the Lewis acid, generating two ionic entities with opposite charges by the BIE (Binary Ionogenic Equilibria) mechanism. In this case, a zwitterion entity, which is partly the cause of the formation of the trimers, is generated. The use of polar solvents is then essential to separate the charges and to limit the formation of trimers but these polar solvents (nitrobenzene, nitro derivatives, chloroform), because of their toxicity, restrict large-scale production of these polymers. It is also important to note two additional difficulties in this chemistry: the toxicity of DMK and its propensity to generate explosive peroxides.

The Applicant Company has now found that, depending on the operating conditions for the polymerization of DMK, it is possible to selectively direct the polymerization toward the formation of a polymer of β-ketone structure with very good yields, >65%, and in the presence of conventional inexpensive solvents which do not exhibit the degrees of dangerousness of the solvents mentioned above. Furthermore, for better effectiveness and better reproducibility, the Applicant Company has adopted a position in cationic catalysis requiring a catalyst which is soluble in the solvent used. It has also disposed of the problems of formation of peroxides, in order to make possible safe production of PDMK, and problems of transfer reactions which interfere with the results and bring about the formation of chains of low molecular mass. These various parameters make possible large-scale synthesis of PDMK.

SUMMARY OF THE INVENTION

A subject matter of the invention is a cationic catalysis system comprising an initiator (I), a catalyst (K) and a cocatalyst (CoK).

According to one embodiment, the catalytic system is characterized in that the cocatalyst (CoK) is an agent which releases the polymerization active center from its counteranion generated by the reaction between the catalyst (K) and the initiator (I).

According to one embodiment, the catalytic system is characterized in that the cocatalyst (CoK) is a molecule having at least one double bond depleted in electrons by an electron-withdrawing group. Mention may be made, for example, of the following molecules: o-chloranil (3,4,5,6-tetrachloro-1,2-benzoquinone), p-chloranil (2,3,5,6-tetrachloro-1,4-benzoquinone), nitrobenzene, trinitrobenzene, difluoronitrobenzene, tetracyanoethylene, pentafluorobenzene, hexafluorobenzene or octafluorotoluene.

According to one embodiment, the catalytic system is characterized in that the catalyst (K) comprises an element (M) belonging to Groups IB, IIB and A, IIIB and IIIA, IVB and IVA, VB and VA, and VIIIB of the Periodic Table of the Elements.

According to one embodiment, the catalytic system is characterized in that the element (M) is taken from the group consisting of the chemical elements B, Ti, Sn, Al, Hf, Zn, Be, Sb, Ga, In, Zr, V, As and Bi.

According to one embodiment, the catalytic system is characterized in that the catalyst (K) is a Lewis acid of general formula $R_nMX_{3-n}$ for M an element belonging to Group IIIA, of general formula $MX_4$ for M an element belonging to Groups VA, IVA and IVB, and of general formula $MX_5$ for M an element belonging to Group VB, with:

R a monovalent radical taken from the group consisting of trifluoromethylsulfonate, hydrocarbon groups with 1 to 12 carbon atoms of alkyl, aryl, arylalkyl, alkylaryl or cycloalkyl type, and alkoxys;

X a halogen atom taken from the group F, Cl, Br and I;

n an integer from 0 to 3.

According to one embodiment, the catalytic system is characterized in that the catalyst is taken from the group consisting of $TiCl_4$, $ZrCl_4$, $SnCl_4$, $VCl_4$, $SbF_5$, $AlCl_3$, $AlBr_3$, $BF_3$, $BCl_3$, $FeCl_3$, $EtAlCl_2$, $Et_{1.5}AlCl_{1.5}$, $Et_2AlCl$, $AlMe_3$ and $AlEt_3$.

According to one embodiment, the catalytic system is characterized in that the initiator (I) can be a monofunctional molecule (I1), a difunctional molecule (I2), a molecule substituted by one or more halogen atoms (I3) or a Brønsted acid (I4).

Another subject matter of the invention is a process for the catalytic polymerization of C3 to C10 monomers involving a catalytic system as described above.

According to one embodiment, the process is characterized in that the monomers are taken from the group consisting of dimethylketene, isobutylene, but-1-ene, 4-methylpent-1-ene, oct-1-ene, 2-methylbut-1-ene, 3-methylbut-1-ene, 2-methylbut-2-ene, styrene, styrenes substituted by alkyl radicals, such as α-methylstyrene or p-methylstyrene, halosubstituted styrenes, such as p-chlorostyrene, propylene, isopentene, vinyl monomers in general and vinyl ethers in particular, diolefins or cyclodiolefins with conjugated dienes, such as 1,3-butadiene, 2,3-dimethyl-1,3-butadiene, hexadiene, myrcene, 6,6-dimethylfulvene, piperylene, isoprene, cyclopentadiene, cyclohexadiene or vinylnorbornene, and β-pinene.

In addition, the invention relates to the polymer capable of being obtained by the process described above and also relates to the use of the catalytic system defined above.

The advantages of the invention are as follows:

The catalytic system, thus generated either before polymerization or in situ, makes it possible to prevent the formation of trimer which occurs during the polymerization of DMK in the presence of a Lewis acid alone. This is because the entity which initiates the polymerization produces a neutral end which thus prevents the formation of the zwitterion intermediate to the trimer. This process thus makes it possible to operate in nonpolar solvents or solvents of moderate polarities, the toxicity of which is compatible with large-scale use, in contrast to the polar solvents mentioned above, without formation of trimer.

The catalytic system makes it possible to control the nature of the chain ends by choosing the nature of the initiator. It is thus possible to introduce, at the chain end, a functionality which is unreactive in cationic polymerization but which makes possible subsequent modification of the polymer. Moreover, it is also possible to generate branched or star polymers by using an initiator with a functionality of greater than 2.

The cocatalyst (CoK) of the catalytic system (I+K+CoK) makes it possible, depending on its nature, to dissolve the catalyst (K) even in a weakly polar and soluble medium, even at high concentrations, of the order of 1M, of Lewis acid as catalyst (K), whereas it is generally difficult to dissolve this acid in solvents of low polarity. For example, the solubility of $AlCl_3$ in the absence of the cocatalyst does not exceed $1.5 \times 10^{-3}$M in dichloromethane. Furthermore, the catalytic system according to the invention exhibits an increased catalytic activity, hence the possibility of using a smaller amount of the catalyst. An increase in the kinetics of the reaction with the release of the active center (oxocarbenium) from its counteranion is thus observed. A reduction in the transfer reactions by virtue of the capture of said counteranion is also observed. Chains with higher molar masses and an increase in the yield are thus obtained.

DETAILED DESCRIPTION OF THE DRAWINGS

Figure 1:
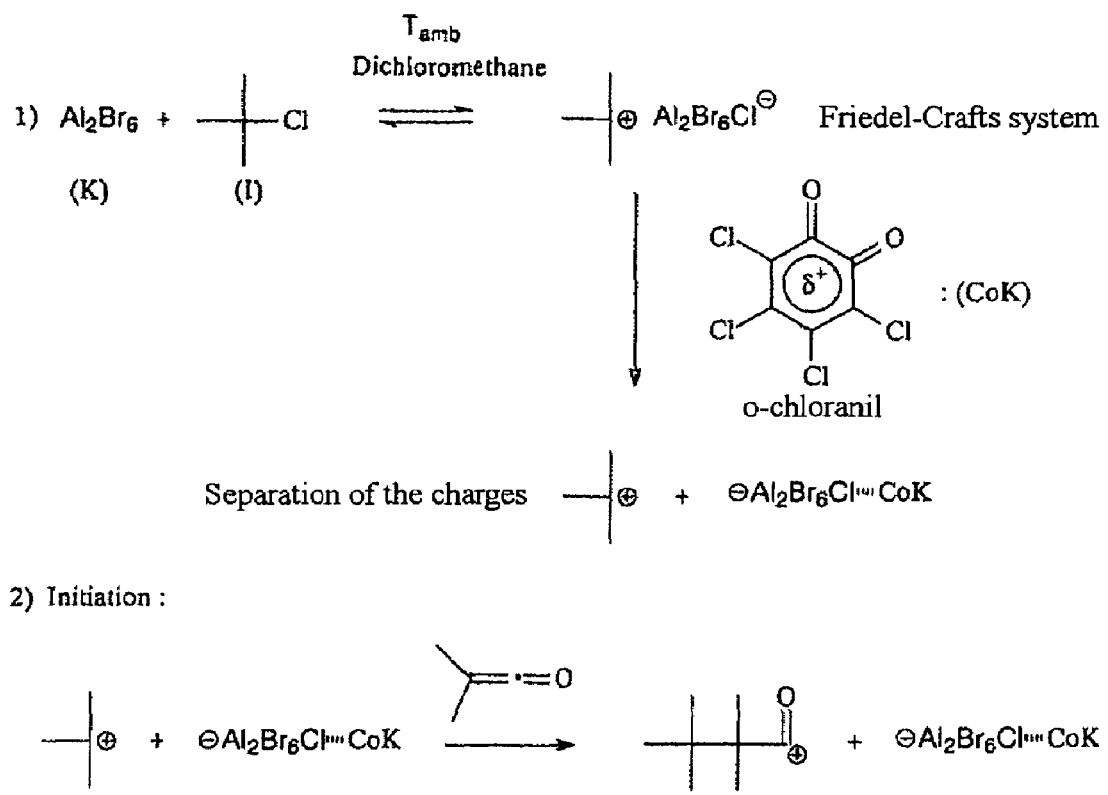
FIG. 1 represents the phase of initiation of the cationic polymerization with $AlBr_3$ as catalyst (K), tert-butyl chloride as initiator (I) and o-chloranil as cocatalyst (CoK).

The invention will now be described in more detail.

The cationic catalysis system according to the invention involves an initiator (I), a catalyst (K) and a cocatalyst (CoK).

Our cationic catalysis system is not limited to the polymerization of DMK. Other monomers can also be polymerized with this system, such as isobutylene, but-1-ene, 4-methylpent-1-ene, oct-1-ene, 2-methylbut-1-ene, 3-methylbut-1-ene, 2-methylbut-2-ene, styrene, styrenes substituted by alkyl radicals, such as α-methylstyrene or p-methylstyrene, halosubstituted styrenes, such as p-chlorostyrene, propylene, isopentene, vinyl monomers in general and vinyl ethers in particular, diolefins or cyclodiolefins with conjugated dienes, such as 1,3-butadiene, 2,3-dimethyl-1,3-butadiene, hexadiene, myrcene, 6,6-dimethylfulvene, piperylene, isoprene, cyclopentadiene, cyclohexadiene or vinylnorbornene, and β-pinene.

The solvent in which the polymerization takes place also has an important role. It must not only promote the separation of the charges but must also solvate the growing chains, in order to slow down precipitation, while not interfering with the approach of the monomer by the formation of a solvent cage. While polar solvents promote the dissociation of the ion pairs by their high dielectric constant and thus increase the proportion of free reactive ions, they also preferentially solvate the active centers and thus limit the conversions by interfering with the approach of the monomer. Generally, it is not necessary for there to be obstacles to the solvation of the active centers by the DMK. In a nonpolar or moderately polar solvent, the DMK will preferentially solvate the growing chains but the transfer reactions will be promoted by the solvent; the use of a complexing agent then makes it possible to limit these reactions in order to obtain high molar masses.

The polymerization can thus take place in a solvent of saturated or unsaturated, aliphatic or alicyclic and substituted or unsubstituted hydrocarbon type. The reaction can also take place in a mixture of solvents of this type. Mention may be made, as examples, of hydrocarbons, such as hexanes, heptanes, toluene, methylcyclohexane, ethylcyclohexane or propylcyclohexane, alkyl chlorides (primary and secondary halogenated alkyl), such as methylene chloride, ethyl chloride, propyl chloride, butyl chloride, pentyl chloride or hexyl chloride, chlorobenzene, dichloromethane, chloroform and the same compounds with one or more atoms (according to the circumstances) of bromine instead of the atom or atoms of chlorine, or nonaromatic nitrated hydrocarbons, such as nitromethane, nitroethane and nitropropane. However, nontoxic and nonpolluting solvents will generally be preferred.

As regards the initiator (I), it is chosen from conventional initiators forming part of Friedel-Crafts systems for the cationic polymerization of olefins. It can be:

(I1) monofunctional, that is to say can exhibit a single chemical functional group and can have a general chemical formula as follows: $R_1$—CO—X, $R_1$—COO—$R_2$ and $R_1$—O—$R_2$ with the $R_1$ and $R_2$ groups taken from the group consisting of the following components: a hydrogen atom, an alkyl/aryl group, such as $CH_3$, $CH_3CH_2$, $(CH_3)_2CH$, $(CH_3)_3C$ or $C_6H_5$, and substituted aromatic rings, it being possible for the $R_1$ and $R_2$ groups to be identical or different, and X a halogen atom (F, Cl, Br or I);

(I2) difunctional, that is to say can exhibit two chemical functional groups that can have a general chemical formula as follows: $X_1$—CO—R—CO—$X_2$ or $R_1$—O—CO—R—CO—O—$R_2$, with the R group taken from the group consisting of the following components: an alkyl/aryl group, such as $CH_3$, $CH_3CH_2$, $(CH_3)_2CH$, $(CH_3)_3C$ or $C_6H_5$, and substituted aromatic rings, and the $R_1$ and $R_2$ groups taken from the group consisting of the following components: a hydrogen atom, an alkyl/aryl group, such as $CH_3$, $CH_3CH_2$, $(CH_3)_2CH$, $(CH_3)_3C$ or $C_6H_5$, and substituted aromatic rings, it being possible for the $R_1$ and $R_2$ groups to be identical or different, and $X_1$ and $X_2$ taken from the group consisting of F, Cl, Br and I, it being possible for the $X_1$ and $X_2$ groups to be identical or different;

(I3) a halogenated derivative with the following general chemical formula:

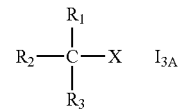

in which X is a halogen (F, Cl, Br or I), $R_1$ is selected from the group consisting of alkyl groups with 1 to 8 carbon atoms and alkenyl groups having from 2 to 8 carbon atoms, $R_2$ is selected from the group consisting of alkyl groups having from 4 to 200 carbon atoms, alkenyl, phenyl, phenylalkyl (radical in the alkyl position) and alkylphenyl (radical in the phenyl position) groups having from 2 to 8 carbon atoms, and cycloalkyl groups having from 3 to 10 carbon atoms, and $R_3$ is taken from the group consisting of alkyl groups having from 1 to 8 carbon atoms and alkenyl and phenylalkyl (alkyl radical) groups having 2 to 8 carbon atoms; $R_1$, $R_2$ and $R_3$ can also be of the adamantyl or bornyl form with X being in a tertiary carbon position;

or with the following general chemical formula:

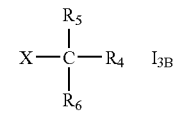

in which X is halogen (F, Cl, Br or I), $R_5$ is taken from the group consisting of alkyl groups having from 1 to 8 carbon atoms and alkenyl groups having from 2 to 8 carbon atoms, $R_6$ is taken from the group consisting of alkyl groups having from 1 to 8 carbon atoms and alkenyl or phenylalkyl (alkyl radical) groups having from 2 to 8 carbon atoms and $R_4$ is taken from the group consisting of phenylene, biphenylene, α,ω-diphenylalkane and —$(CH_2)_n$— groups with n an integer from 1 to 10;

or with the following general chemical formula:

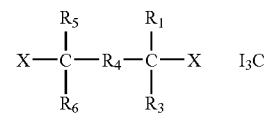

with X, $R_1$, $R_3$, $R_4$, $R_5$ and $R_6$ as defined above;

(I4) a protic acid, such as, for example, $CF_3SO_3H$, $H_2SO_4$, $HClO_4$, HBr, HCl and HI.

Mention may be made, as examples of initiators (I), of cumyl esters of hydrocarbon acids, such as 2-acetyloxy-2-phenylpropane, alkyl cumyl ethers, such as 2-methoxy-2-phenylpropane or 1,4-di(2-methoxy-2-propyl)benzene, cumyl halides, particularly the chlorinated derivatives, such as 2-chloro-2-phenylpropane, (1-chloro-1-methylethyl)benzene, 1,4-di(2-chloro-2-propyl)benzene or 1,3,5-tri(2-chloro-2-propyl)benzene, aliphatic halides, particularly chlorinated derivatives, such as 2-chloro-2,4,4-trimethylpentane (TMPCl), 2-bromo-2,4,4-trimethylpentane (TMPBr) or 2,6-dichloro-2,4,4,6-tetramethylheptane, hydroxyaliphatics or hydroxycumyls, such as 1,4-di(2-hydroxy-2-propyl)benzene or 2,6-dihydroxy-2,4,4,6-tetramethylheptane, 1-chloroadamantane, 1-chlorobornane, 5-(tert-butyl)-1,3-di(1-chloro-1-methylethyl)benzene and other similar compounds.

As regards the catalyst (K), this is a Lewis acid, preferably a strong Lewis acid (such as, for example: $AlCl_3$, $AlBr_3$, $EtAlCl_2$, $BF_3$, $BCl_3$, $SbF_5$ or $SiCl_4$), in order to favor the ketone structure, of general chemical formula $RnMX_{3-n}$, $MX_4$ or $MX_y$ depending on the nature of the element M, with:

M an element belonging to Groups IB, IIB and A, IIIB and IIIA, IVB and IVA, VB and VA, and VIIIB of the Periodic Table of the Elements; by way of examples, mention may be made, for M, of the following elements: B, Ti, Sn, Al, Zn, Be, Sb, Ga, In, Zr, V, As or Bi. Preferably, M belongs to Groups:
IIIA (formula $R_nMX_{3-n}$);
VA and VB (formula $MX_y$);
IVA and IVB (formula $MX_4$);

R a monovalent radical taken from the group consisting of trifluoromethylsulfonate, hydrocarbon groups with 1 to 12 carbon atoms of alkyl, aryl, arylalkyl, alkylaryl or cycloalkyl type, and alkoxys, such as, for example, the following groups: $CH_3$, $CH_3CH_2$, $(CH_3)_2CH$, $(CH_3)_3C$ or $C_6H_5$, substituted aromatic rings, $OCH_3$, $OC_2H_5$ or $OC_3H_7$. The terms "arylalkyl" and "alkylaryl" refer to a radical comprising coupled aliphatic and aromatic structures, the radical being in the alkyl position in the first case and in the aryl position in the second case, X a halogen taken from the group F, Cl, Br and I, preferably Cl, n an integer from 0 to 3 and y an integer from 3 to 5.

Mention may be made, as examples, of $TiCl_4$, $ZrCl_4$, $SnCl_4$, $VCl_4$, $SbF_5$, $AlCl_3$, $AlBr_3$, $BF_3$, $BCl_3$, $FeCl_3$, $EtAlCl_2$ (abbreviation EADC), $Et_{1.5}AlCl_{1.5}$ (abbreviation EASC) and $Et_2AlCl$ (abbreviation DEAC), $AlMe_3$ and $AlEt_3$. The Lewis acids can also be supported on clays, zeolites, silica or silica/alumina, this making possible the recovery of the supported catalyst at the end of the reaction and thus the recycling thereof.

The Lewis acids which are particularly preferred for our cationic polymerization system are $AlCl_3$, $AlBr_3$, EADC, EASC, DEAC, $BF_3$ and $TiCl_4$.

As regards the cocatalyst (CoK), this is an agent which releases the polymerization active center from the counteranion generated by the reaction between the catalyst (K) and the initiator (I). The polymerization active center is thus rendered more accessible by virtue of the action of the CoK. The cocatalyst is in particular a complexing agent which serves to complex the counteranion generated by the reaction between the catalyst and the initiator, having the effect of releasing the polymerization active center. Mention may be made, as examples, of o-chloranil (3,4,5,6-tetrachloro-1, 2-benzoquinone), p-chloranil (2,3,5,6-tetrachloro-1,4-benzoquinone), nitrobenzene, trinitrobenzene or tetracyanoethylene.

It would not be departing from the invention if use were made of a transfer agent and/or a chain-length limiting agent well known to a person skilled in the art in the field of cationic catalysis, in addition to the protagonists of the catalysis which are mentioned above.

In order to carry out the polymerization of DMK to polydimethylketene (PDMK), the polymerization reactor is cooled to the polymerization temperature shown in the following Table 1. The gaseous DMK is purified (by absorption/desorption) with a neutral washing solvent, such as, for example, an n-alkane or an aromatic compound, and is subsequently absorbed into the polymerization solvent. The mixture of K, I and CoK is subsequently either prepared in situ in the polymerization solvent before or after the absorption of the DMK into the polymerization solvent or is prepared in ex situ solution and is then added to the polymerization reactor before or after the absorption of the DMK into the polymerization solvent. It is important to take care that the temperature of the reaction does not increase during the reaction as any increase in temperature promotes the formation of the ester functional group at the expense of the formation of the ketone functional group. The ideal temperature range for obtaining good chemoselectivity (formation of monomer (A) and thus of ketone functional group) is −30 to −50° C. Nevertheless, the polymerization can also be carried out at ambient temperature with very good results but, in this case, it is preferable to reduce the concentration of monomer. The polymerization reaction according to the invention makes it possible to obtain a chemoselectivity ≧95 mol %.

At the end of the reaction, the unreacted DMK is neutralized with ethanol and then the contents of the reactor are filtered. The PDMK is recovered, washed and then dried at 100° C. under vacuum for 1 hour. The polymer is white and predominantly possesses a β-ketone structure (measurements carried out by FTIR). The cationic catalysis polymerization process according to the invention can be carried out continuously, with reuse of the solvent and of the unreacted monomer.

The following results (see table 1) are obtained according to the operating conditions shown. Examples 1, 2, 3 and 4 were carried out according to the invention, in contrast to comparative examples 1 and 2.

It is found that the amounts of catalysts are high for Comp. 1 and 2:17 and 100 times more moles of DMK than of K are necessary for Comp. 1 and 2 respectively, whereas 1687 and 210 times more moles of DMK than of K are necessary for Ex. 1 and 2 respectively. Furthermore, the polymerization times are longer (180 min for Comp. 2, 120 min for Ex. 1 and 2 and 60 min for Ex. 4).

The process according to the invention makes it possible to have better effectiveness of the catalyst and makes it possible to synthesize markedly larger amounts of PDMK, in contrast to the operating conditions of Comp. 1 and 2.

As regards Ex. 3, the weight-average molar mass (Mw) is 300 000 g/mol and the number-average molar mass (Mn) is 125 000 g/mol, as polystyrene equivalent, giving a polydispersity index (PI=Mw/Mn) of 2.4. The polymerization according to the invention thus makes it possible to obtain greater homogeneity in the length of the chains, in contrast to the polymerization according to the prior art.

As regards Comp. 2, Mw=525 000 g/mol and Mn=57 000 g/mol, as polystyrene equivalent, giving PI=9.4.

As regards the selectivity of the polymerization, the proportion of the ester and ketone units in the polymer is measured by Fourier transform infrared spectroscopy (abbreviation FTIR). The proportions of the two units are evaluated by the ratio of the Optical Density of the band at 1740 $cm^{-1}$ (band characteristic of the ester functional groups), abbreviation OD1, to the Optical Density of the band at 1388 $cm^{-1}$ (band characteristic of the ketone functional groups), abbreviation OD2. This measurement makes it possible to compare the batches with one another but is not a direct measurement of the proportion of each unit. By way of indication, an ester unit is not detected in the spectrum obtained by $^{13}C$ nuclear magnetic resonance in a PDMK with an ester/ketone ratio of 0.2 (resolution limit, less than 5%). After washing, for examples Ex. 1, Ex. 2 and Ex. 3, the OD1/OD2 ratios are less than 0.19 and, for Comp. 2, the OD1/OD2 ratio is 0.2. After washing, for example Ex. 4, where initiation was carried out at low temperature but where propagation took place at ambient temperature, the OD1/OD2 ratio is 0.3. The influence of the temperature is therefore important in order to control the chemoselectivity. By operating at low temperature and with controlled operating conditions, it is possible to obtain PDMK exhibiting no ester band in its FTIR spectrum after washing.

In a counterexample, the conditions employed were the same as those described in example 4 but without addition of o-chloranil in the formulation of the catalyst. In this case, the polymerization yield significantly decreases (16%) with a longer polymerization time (100 minutes). This experiment thus makes it possible to confirm the role of activator of the complexing agent.

By way of example, the handling described in example 4 was tested with 2-iodo-2-methylpropane and leads to very similar results.

6. The catalytic system as claimed in claim 4, wherein the catalyst (K) is a Lewis acid of general formula $R_nMX_{3-n}$ for M an element belonging to Group IIIA, of general formula $MX_4$ for M an element belonging to Groups VA, IVA and IVB, and of general formula $MX_5$ for M an element belonging to Group VB, with:

R a monovalent radical taken from the group consisting of trifluoromethylsulfonate, hydrocarbon groups with 1 to 12 carbon atoms of alkyl, aryl, arylalkyl, alkylaryl or cycloalkyl type, and alkoxys;

X a halogen atom taken from the group F, Cl, Br and I;

n an integer from 0 to 3.

7. The catalytic system as claimed in claim 4, wherein the catalyst is selected from the group consisting of $TiCl_4$, $ZrCl_4$, $SnCl_4$, $VCl_4$, $SbF_5$, $AlCl_3$, $AlBr_3$, $BF_3$, $BCl_3$, $FeCl_3$, $EtAlCl_2$, $Et_{1.5}AlCl_{1.5}$, $Et_2AlCl$, $AlMe_3$ and $AlEt_3$.

TABLE 1

|  | Ex. 1 | Ex. 2 | Ex. 3 | Ex. 4 | Comp. 1 | Comp. 2 |
|---|---|---|---|---|---|---|
| Initiator (I) | Isobutyryl chloride | Isobutyryl chloride | tert-Butyl chloride | tert-Butyl chloride | — | — |
| mol | 0.0057 | 0.0041 | 0.0064 | 0.0047 | | |
| Catalyst (K) | $AlBr_3$ | $AlCl_3$ | $AlCl_3$ | $AlCl_3$ | $AlBr_3$ | $AlBr_3$ |
| mol | 0.0114 | 0.0082 | 0.0064 | 0.0047 | 0.0020 | 0.0020 |
| Cocatalyst (CoK) | o-Chloranil | o-Chloranil | o-Chloranil | o-Chloranil | — | — |
| mol | 0.0057 | 0.00412 | 0.0064 | 0.0047 | | |
| DMK (mol) | 1.900 | 1.750 | 1.500 | 0.910 | 0.068 | 0.220 |
| Solvent | $CH_2Cl_2$ | $CH_2Cl_2$ | $CH_2Cl_2$ | $CH_2Cl_2$ | BzNO*/$CCl_4$ | BzNO*/$CCl_4$ |
| ml | 190 | 190 | 190 | | 10/10 | 16.5/19 |
| DMK/(K) | 167 | 210 | 234 | 410 | 17 | 100 |
| (K)/(I) | 2 | 2 | 1 | 1 | — | — |
| Reaction temperature (° C.) | −35 | −45 | −35 | −35 to 25 | −45 | −30 |
| Polymerization time (min) | 120 | 120 | 90 | 60 | 45 | 180 |
| Yield (%) | 65 | 70 | 80 | 80 | 50 | 55 |
| K effectiveness g of PDMK/mol of K | 4780 | 6600 | 12 890 | 8880 | 596 | 3860 |
| I effectiveness g of PDMK/mol of I | 9540 | 13 200 | 12 890 | 8880 | — | — |

*BzNO = nitrobenzene

What is claimed is:

1. A cationic catalysis system comprising an initiator (I), a catalyst (K) and a cocatalyst (CoK), wherein the cocatalyst (CoK) is an agent which releases the polymerization active center from its counterion generated by the reaction between the catalyst (K) and the initiator (I).

2. The catalytic system as claimed in claim 1, wherein the cocatalyst (CoK) is a molecule having at least one double bond depleted in electrons by an electron-withdrawing group.

3. The catalytic system as claimed in claim 2, wherein the cocatalyst (CoK) is selected from the group of complexing agents consisting of o-chloranil (3,4,5,6-tetrachloro-1,2-benzoquinone), p-chloranil (2,3,5 6-tetrachloro-1,4-benzoquinone), nitrobenzene, trinitrobenzene, tetracyanoethylene, difluoronitrobenzene, pentafluorobenzene, hexafluorobenzene and octafluorotoluene.

4. The catalytic system as claimed in claim 1, wherein the catalyst (K) comprises an element (M) selected from the group consisting of Groups IB, IIB and A, IIIB and IIIA, IVB and IVA, VB and VA, and VIIIB of the Periodic Table of the Elements.

5. The catalytic system as claimed in claim 4, wherein the element (M) is selected from the group consisting of the chemical elements B, Ti, Sn, Al, Hf Zn, Be, Sb, Ga, In, Zr, V, As and Bi.

8. The catalytic system as claimed in claim 4, wherein the initiator (I) can be a monofunctional molecule (I1), a difunctional molecule (I2), a molecule substituted by one or more halogen atoms (I3) or a Brøsted acid (I4).

9. A process for the cationic polymerization of C3 to C10 monomers involving a catalytic system comprising an initiator (I), a catalyst (K) and a cocatalyst (CoK), wherein the cocatalyst (CoK) is an agent which releases the polymerization active center from its counterion generated by the reaction between the catalyst (K) and the initiator (I).

10. The process as claimed in claim 9, wherein the monomers are selected from the group consisting of dimethylketene, isobutylene, but-1-ene, 4-methylpent-1 ene, oct-1-ene, 2-methylbut-1-ene, 3-methylbut-1-ene, 2-methylbut-2-ene, styrene, styrenes substituted by alkyl radicals, α-methylstyrene, p-methylstyrene, halosubstituted styrenes, p-chlorostyrene, propylene, isopentene, vinyl monomers, vinyl ethers, diolefins or cyclodiolefins with conjugated dienes, 1,3-butadiene, 2,3-dimethyl-1,3-butadiene, hexadiene, myrcene, 6, 6-dimethylfulvene, piperylene, isoprene, cyclopentadiene, cyclohexadiene, vinylnorbornene, and β-pinene.

* * * * *